United States Statutory Invention Registration [19]

[11] Reg. Number: H593

[43] Published: Mar. 7, 1989

Cooksey et al.

[54] ELECTROMECHANICAL SAFE AND ARM MECHANISM

[75] Inventors: George E. Cooksey; James V. McVay, both of Ridgecrest, Calif.

[73] Assignee: The United States of America as represented by the Secretary of the Navy, Washington, D.C.

[21] Appl. No.: 178,031

[22] Filed: Apr. 11, 1988

[51] Int. Cl.[4] ..... F42C 15/24; F42C 25/40

[52] U.S. Cl. ..... 102/248; 102/255; 102/264

[56] References Cited

U.S. PATENT DOCUMENTS

| | | | |
|---|---|---|---|
| 3,890,901 | 6/1975 | Anderson et al. | 102/264 |
| 3,924,535 | 12/1975 | Roos et al. | 102/215 |
| 4,036,144 | 7/1977 | Meek | 102/254 |
| 4,099,466 | 7/1978 | Redmond et al. | 102/255 |
| 4,286,522 | 9/1981 | Trayner | 102/255 |

*Primary Examiner*—David H. Brown

*Attorney, Agent, or Firm*—William C. Townsend; W. Thom Skeer; Stephen J. Church

[57] ABSTRACT

A setback motivated element has its movement to an armed position controlled by an electromechanical escapement which permits arming only upon the reception of a predetermined number of electrical pulses of opposite polarity to provide protection against improper arming due to either electronic or mechanical failure.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROMECHANICAL SAFE AND ARM MECHANISM

BACKGROUND OF THE INVENTION

1. Field of the Invention

This invention pertains to the field of igniting devices for ammunition and explosives. More particularly, it pertains to such a device having a slide or rotor controlled by a logic device.

2. Description of the Prior Art

Safe and arm devices utilizing a weight set back by acceleration to motivate a rotor or slide into arming position are well known. It is also well known to utilize an electronic device sensitive to time, acceleration, and the like to drive an electromechanical device with a predetermined signal sequence indicating proper conditions for arming, the electromechanical device being configured so that only the predetermined signal sequence will result in arming. Such a combination of electronic and electromechanical elements is particularly effective since elaborate logic may be provided without improper arming due to electronic failure and with final control of arming being effected by simple and rugged setback elements.

SUMMARY OF THE INVENTION

The present invention is a safe and arm mechanism having a member urged toward an armed position by a set back weight with movement of the element toward this position limited by an escapement released by a predetermined number of successive, opposite direction movements of another element oscillated by an electromechanical actuator driven by opposite polarity electrical signals.

It is object of the present invention to provide an electro-mechanical safe and arm mechanism having interlocks preventing improper arming due to electronic or mechanical failures.

Another object is to provide such a mechanism which attains an armed position only when energized by predetermined number of electrical pulses of alternate polarity.

BRIEF DESCRIPTION OF THE DRAWINGS

Other objects, advantages and novel features of the present invention will be apparent from the following detailed description when considered with the accompanying drawings in which.

DETAILED DESCRIPTION OF THE INVENTION

Figure 1:
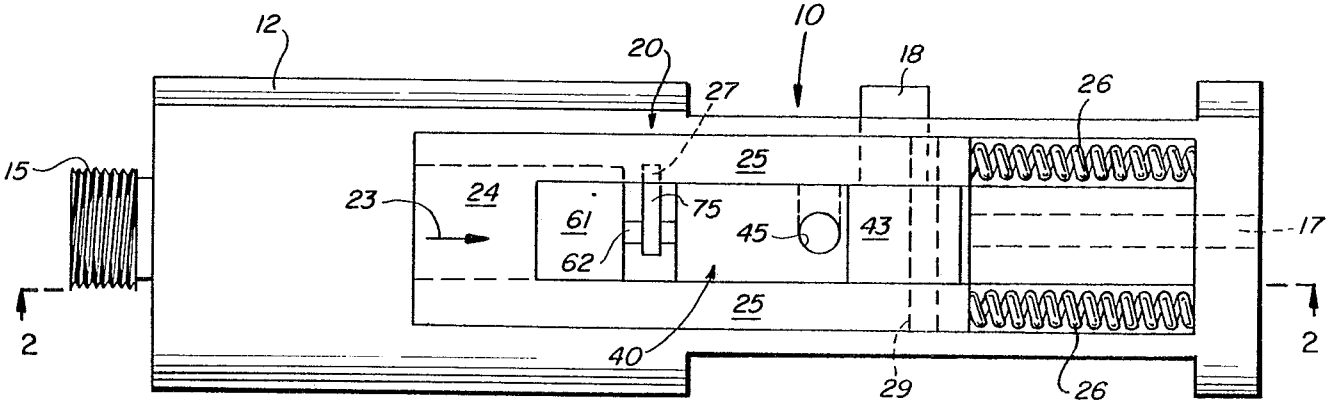
FIG. 1 is a side view of a safe and arm device embodying the present invention.

FIGS. 1 through 4 show an electromechanical safe and arm escapement mechanism 10 embodying the present invention and mounted in a generally cylindrical housing 12. An electronic logic unit 14 having a connector 15 to the balance of a missile or the like, not shown and used with mechanism 10, is received is one end of housing 12. An explosive lead 17 extends axially into housing 12 from the other end thereof nearly to a detonator 18 mounted on one side of the housing.

Unit 14 is not a portion of the present invention and is constructed so as to output a predetermined number of direct current pulses of alternate electrical polarity when there exists predetermined conditions suitable for arming of a warhead or the like initiated by detonator 18. For illustrative purposes unit 14 may be considered as providing four such pulses, two of each polarity, to mechanism 10.

Figure 2:
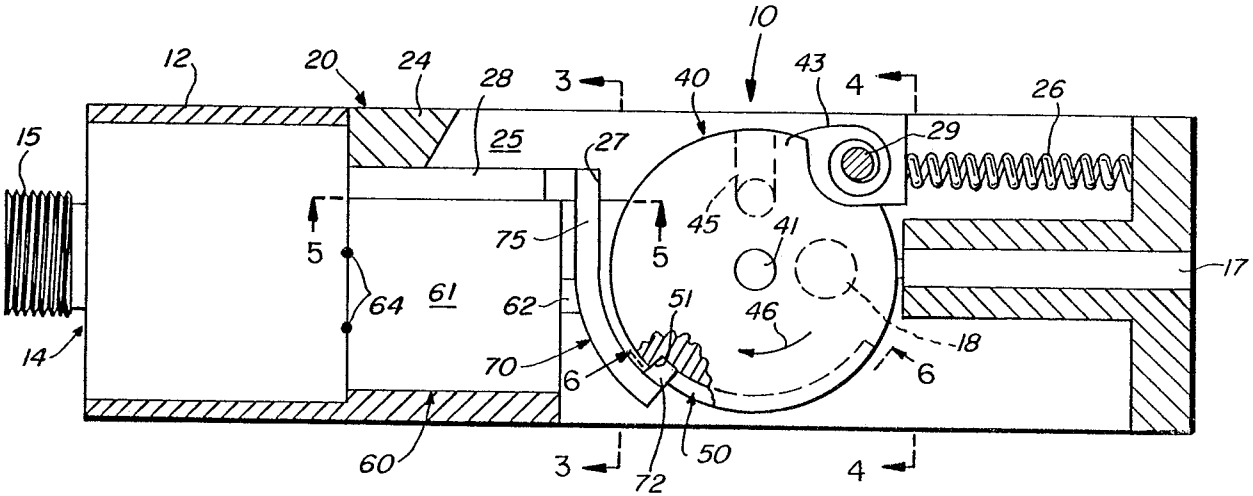
FIG. 2 is an axial section of the device on line 2—2 or FIG. 1.
Figure 4:
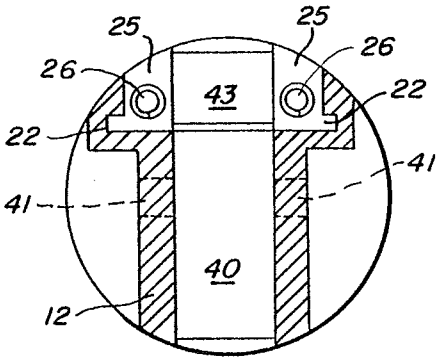
FIG. 4 is a diametrical section on line 4—4 of FIG. 2.
Figure 3:
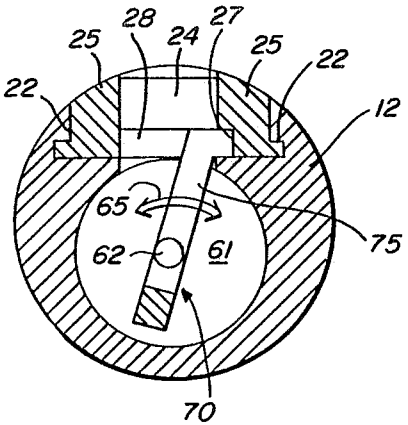
FIG. 3 is a diametrical section of the device on line 3—3 of FIG. 2.
Figure 5:
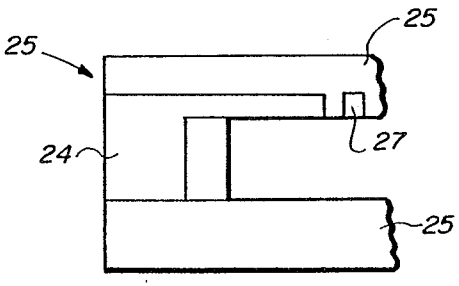
FIG. 5 is a fragmentary section on line 5-5 of FIG. 2.

A set-back weight 20 is mounted in housing 12 by tongues and grooves 22, FIGS. 3 and 4, for movement of the weight axially of the housing from the depicted position in the direction indicated by arrow 23, FIG. 1, toward the housing end with lead 17. Weight 20 is disposed at one side of housing 12 and is U-shaped, having a cross member 24 and a pair of arms 25 extending axially of housing 12 individually to springs 26 which urge the weight toward unit 14. As seen in FIGS. 1, 2, 3, and 5, arm 25 has a notch 27 in its edge toward the axis of housing 12, this notch being disposed centrally along the arm. As indicated by numeral 28, this edge is cut away, as is the side of member 24 centrally of housing 12, from notch 27 to the weight end toward unit 14. Weight 20 has a pin 29 extending between arms 25 at their end remote from member 24.

Mechanism 10 includes a cylindrical rotor 40 best shown in FIGS. 1, 2, and 4. Rotor 40 is mounted on housing 12 for pivotal movement about an axis defined by a pivot 41 which extends transversely of the housing as shown in FIGS. 2 and 4. The diameter of rotor 40 is somewhat less than that of housing 12 and the axial length of rotor 40 is substantially the distance between arms 25, between which one side of the rotor is received. This rotor side is connected to pin 29 by a spiral spring 43, and rotor 40 is disposed with its periphery adjacent to lead 17. Rotor 40 is provided with an L-shaped explosive lead 45, FIGS. 1 and 2, which disconnects detonator 18 and lead 17 when the rotor is in a safe position as shown in the Figures. Lead 45 is configured to connect detonator 18 and lead 17 when the rotor pivots 90 degrees, in the direction indicated by arrows 46 in FIGS. 2 and 6, to an armed position, not shown, under the urging of spring 43 when weight 20 moves in direction 23.

Figure 6:
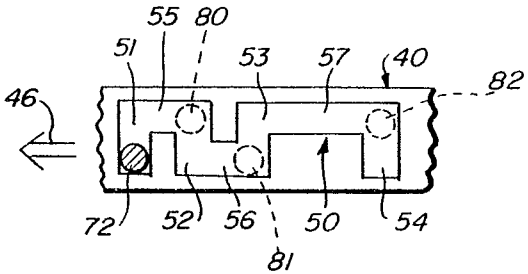
FIG. 6 is a developed fragmentary view, on line 6—6 of FIG. 2 and at a larger scale, of a rotor of the device.

The periphery of rotor 40 defines a sinuous track 50, shown in FIGS. 2 and 6 and having four successive transverse paths 51–54 extending axially of the rotor. Paths 51 and 54 are spaced 90 degrees apart about the rotor periphery and the ends of the four paths are joined, alternately at the opposite axial sides of rotor 40, by longitudinal paths 55–57 of track 50.

It is apparent that acceleration of housing 12 in a direction from lead 17 toward unit 14 is an arming condition urging rotor 40 to move from the safe to the armed position thereof and it is evident that rotor 40 may be considered as an element unitarily constructed with a peripheral member thereof defining track 50.

Mechanism 10 includes a polarized rotary solenoid 60 shown in FIG. 1, 2, and 3. Such a solenoid especially suited for the practice of the present invention is disclosed in U.S. patent application, Ser. No. 07/014,904, filed Feb. 9, 1987 and incorporated herein by reference. Solenoid 60 has a cylindrical body 61 mounted in housing 12 axially parallel therewith and opposite rotor 40 from lead 17. Solenoid 60 has an output shaft 62 coaxial with body 61 and extended somewhat therefrom toward the periphery of rotor 40. Shaft 62 extends orthogonally to the axis of pivot 41 and is angularly spaced about the rotor from the position of path 51 when the rotor is in the depicted safe position. Solenoid 60 receives the above mentioned four electrical pulses of opposite polarity provided by logic unit 14 by any suitable connections thereto, these connections being conventionally represented in FIG. 2 by dots 64. Solenoid 60 is constructed to pivot shaft 62 in opposite directions, indicated by arrowheads 65 in FIG. 3, during such opposite polarity pulses so that these directions individually correspond to the opposite polarities of the pulses.

Mechanism 10 has a lever 70 fixedly connected to shaft 62 for pivotal movement therewith. Lever 70 extends from shaft 62 toward track 50, terminating at a pawl 72 shown in FIGS. 2 and 6. Pawl 72 is fixed to lever 70 so that the pawl moves oppositely in track 50 in a direction along paths 51–54 as the shaft pivots in response to the before mentioned pulses from unit 14. Pawl 72 is a pin extending radially of rotor 40 into track 50, and the length of lever 70 is such that the pawl extends into path 51 when rotor 40 is in its depicted safe position. It is apparent from FIGS. 1, 2, 3, and 6 that rotor 40, which bears track 50, and pawl 70 are mounted by housing 12 and solenoid 60 so that track 50 and pawl 72 move relatively in a direction normal to paths 51–54 as rotor 40 pivots between its safe and armed positions. It is also apparent that solenoid 60 serves to reciprocate pawl 72 relatively in relation to rotor 40 in the direction of paths 51–54 with opposite relative movements between the pawl and the rotor corresponding individually to the pulses from unit 40 to solenoid 60.

Shaft 62 carries a finger 75 which extends oppositely thereof from lever 70 and is an extension of the lever into cutaway 28. Finger 75 is configured to terminate in notch 27 when weight 20 and lever 75 are in an initial position depicted in FIGS. 1–3.

OPERATION

The operation of the described embodiment of the present invention is believed clearly apparent and will now be briefly described.

When mechanism 10 and logic unit 14 are accelerated so as to urge weight 20 in direction 23 and, in turn, urge rotor 40 in direction 46 by spring 43. At this time and when any desired arming conditions required by unit 14 are satisfied, unit 14 begins its output of four pulses. Finger 75 initially locks weight 20 in its depicted position. However, the first pulse of proper polarity withdraws finger 75 from notch 27 and into cutaway 28 and oscillates pawl 72 in track 50 to the opposite side of path 51 from the in which the pawl is depicted in FIG. 6. Rotor 40 is thereby released to move in direction 46, with the pawl passing along path 55 between adjacent paths 51 and 52, until the pawl is in a position shown in dashed lines in path 52 and identified by numeral 80. As the pawl passes along path 55 between paths 51 and 52, rotor 40 pivots a corresponding distance toward its armed position in which lead 45 connects detonator 18 and lead 17.

A second pulse, if of opposite polarity to the first pulse, moves pawl 72 along path 52 from path 55 to path 56. Rotor 40 is thus released for movement of pawl 72 relative to the rotor between adjacent paths 52 and 53 with the rotor moving a further distance, corresponding to the length of path 56, towards the armed position, the rotor stopping when the pawl reaches a position 81. Similarly, a third pulse of opposite polarity to the second pulse and the same polarity as the first pulse, releases rotor 40 to move until pawl 72 reaches the position indicated by numeral 82, at which point the rotor is in its armed position. A fourth pulse of opposite polarity to the third pulse is then administered so that pawl 72 moves along path 54 to the end thereof opposite path 57 and locks rotor 40 in the armed position.

Obviously modifications and variations of the present invention are possible in light of the above teachings. It is, therefore, to be understood that within the scope of the following claims the invention may be practiced other than as specifically described.

What is claimed is:

1. An electromechanical safe and arm mechanism for use with a logic device providing a predetermined number of electrical pulses of alternating polarity, the mechanism comprising:

an arming element urged to move from a safe position thereof to an armed position thereof during a predetermined arming condition;

a pawl;

a member defining a sinuous track receiving the pawl and having said number of transverse paths;

means for mounting the pawl and said member to move relatively in a direction normal to said paths as said element moves between said positions; and solenoid means receiving said pulses for reciprocating the pawl and said member relatively in the direction of said paths with each opposite relative movement between the pawl and said member corresponding to one such opposite polarity pulse, so that during said condition, the pawl and the track are released at each of said pulses for relative movement between an adjacent pair of said paths and so that said element moves a corresponding distance toward the armed position.

2. The mechanism of claim 1:

wherein said mechanism is associated with a housing;

wherein said element and said member are unitarily constructed as a rotor mounted on the housing for pivotal movement about a predetermined axis and between said position and said armed position, said track being defined about the periphery of the rotor with said paths extending axially thereof;

wherein the pawl extends radially of the rotor into the track;

wherein the solenoid means comprises:

a rotary solenoid having a body mounted on the housing and having an output shaft extending orthogonally to said axis and toward said periphery in angularly spaced relation to the pawl, the output shaft pivoting in in opposite directions corresponding to such opposite polarity pulses, and a lever fixed to the output shaft for pivotal movement therewith and extending from the shaft to the pawl with the pawl fixed to the lever so that the pawl moves oppositely in the track in a direction along the paths as the shaft pivots in response to said pulses.

* * * * *